United States Patent
Kapylou et al.

(10) Patent No.: US 10,446,834 B2
(45) Date of Patent: Oct. 15, 2019

(54) POSITIVE ACTIVE MATERIAL, MANUFACTURING METHOD THEREOF, AND POSITIVE ELECTRODE AND LITHIUM BATTERY INCLUDING THE MATERIAL

(71) Applicants: Samsung Electronics Co., Ltd., Suwon-si, Gyeonggi-do (KR); SAMSUNG FINE CHEMICALS CO., LTD., Ulsan (KR); Samsung SDI Co., Ltd., Yongin-si, Gyeonggi-do (KR)

(72) Inventors: Andrei Kapylou, Suwon-si (KR); Donghan Kim, Suwon-si (KR); Jinhwan Park, Seoul (KR); Jayhyok Song, Suwon-si (KR); Sungjin Ahn, Anyang-si (KR); Byongyong Yu, Suwon-si (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 794 days.

(21) Appl. No.: 14/806,969

(22) Filed: Jul. 23, 2015

(65) Prior Publication Data
US 2016/0190555 A1 Jun. 30, 2016

(30) Foreign Application Priority Data
Dec. 29, 2014 (KR) ........................ 10-2014-0192556

(51) Int. Cl.
*H01M 4/36* (2006.01)
*H01M 4/13* (2010.01)
(Continued)

(52) U.S. Cl.
CPC .......... *H01M 4/366* (2013.01); *H01M 4/131* (2013.01); *H01M 4/505* (2013.01); *H01M 4/622* (2013.01); *H01M 4/485* (2013.01); *H01M 4/525* (2013.01)

(58) Field of Classification Search
None
See application file for complete search history.

(56) References Cited

U.S. PATENT DOCUMENTS

| | | | |
|---|---|---|---|
| 7,314,682 B2 * | 1/2008 | Thackeray | C01G 45/1228 423/594.15 |
| 2014/0342229 A1 * | 11/2014 | Kwak | C01B 25/455 429/219 |
| 2015/0228971 A1 * | 8/2015 | Kim | H01M 10/0525 429/223 |

FOREIGN PATENT DOCUMENTS

| | | |
|---|---|---|
| CN | 102723458 A | 10/2012 |
| JP | 4827222 B2 | 9/2011 |

(Continued)

OTHER PUBLICATIONS

Huang et al., "High-Rate LiFePO4 Lithium Rechargeable Battery Promoted by Electrochemically Active Polymers", Chem. Mater., vol. 20, 2008, pp. 7237-7241.

*Primary Examiner* — Jonathan Crepeau
*Assistant Examiner* — Angela J Martin
(74) *Attorney, Agent, or Firm* — Cantor Colburn LLP (57) ABSTRACT

A positive active material including: a core including an overlithiated lithium transition metal oxide, and a coating layer which is disposed on at least a portion of a surface of the core, the coating layer including a polymer having an oxidation potential of about 4.4 volts to about 4.7 volts versus lithium metal. Also a manufacturing method thereof, and a positive electrode and a lithium battery including the positive active material.

19 Claims, 5 Drawing Sheets

(51) Int. Cl.
    *H01M 4/50*     (2010.01)
    *H01M 4/60*     (2006.01)
    *H01M 4/62*     (2006.01)
    *H01M 4/505*     (2010.01)
    *H01M 4/131*     (2010.01)
    *H01M 4/485*     (2010.01)
    *H01M 4/525*     (2010.01)

(56) References Cited

FOREIGN PATENT DOCUMENTS

| | | |
|---|---|---|
| KR | 10-1105342 B1 | 1/2012 |
| KR | 10-1139677 B1 | 4/2012 |
| KR | 1020130117732 A | 10/2013 |

* cited by examiner

POSITIVE ACTIVE MATERIAL, MANUFACTURING METHOD THEREOF, AND POSITIVE ELECTRODE AND LITHIUM BATTERY INCLUDING THE MATERIAL

CROSS REFERENCE TO RELATED APPLICATION

This application claims priority to and the benefit of Korean Patent Application No. 10-2014-0192556, filed on Dec. 29, 2014, in the Korean Intellectual Property Office, and all the benefits accruing therefrom under 35 U.S.C. § 119, the content of which is incorporated herein in its entirety by reference.

BACKGROUND

1. Field

The present disclosure relates to a positive active material, manufacturing methods thereof, and positive electrodes and lithium batteries including the positive active material.

2. Description of the Related Art

In general, transition metal compounds, such as $LiNiO_2$, $LiCoO_2$, $LiMn_2O_4$, $LiFePO_4$, $LiNi_xCo_{1-x}O_2$ (0≤x≤1), $LiNi_{1-x-y}Co_xMn_yO_2$ (0≤x≤0.5, 0≤y≤0.5), or oxides of the transition metal compounds and lithium are used as a positive active material for a lithium battery. These positive active materials have limited electrical capacity. Thus the remains a need for improved positive active material.

SUMMARY

Provided is a high-capacity positive active material having improved lifetime characteristics during high voltage operation of a lithium battery.

Provided is a positive electrode including the positive active material.

Provided is a lithium battery including the positive electrode.

Provided are methods of manufacturing the positive active material.

Additional aspects will be set forth in part in the description which follows and, in part, will be apparent from the description.

According to an aspect, a positive active material includes: a core including an overlithiated lithium transition metal oxide; and a coating layer which is disposed on at least a portion of a surface of the core, the coating layer including a polymer having an oxidation potential of about 4.4 volts to about 4.7 volts versus lithium metal.

According to an embodiment, the overlithiated lithium transition metal oxide may be represented by Formula 1:

$$xLi_2MO_3\text{-}(1-x)LiM'O_2 \qquad \text{Formula 1}$$

wherein in Formula 1, M has an average oxidation number of +4 and is at least one element selected from Period 2 to Period 5 of the Periodic Table of the Elements, M' has an average oxidation number of +3 and is at least one element selected from Period 2 to Period 5 of the Periodic Table of the Elements, and 0<x<1.

According to an embodiment, in Formula 1, M, for example, may be at least one metal selected from manganese (Mn), titanium (Ti), zirconium (Zr), tin (Sn), and molybdenum (Mo), and M', for example, may be at least one metal selected from nickel (Ni), cobalt (Co), Mn, iron (Fe), aluminum (Al), magnesium (Mg), zinc (Zn), copper (Cu), chromium (Cr), vanadium (V), and niobium (Nb).

According to an embodiment, the overlithiated lithium transition metal oxide may include a compound represented by Formula 2:

$$xLi_2MnO_3\text{-}(1-x)LiNi_aCo_bMn_cO_2 \qquad \text{Formula 2}$$

wherein in Formula 2, 0<x<1, 0<a<1, 0<b<1, 0<c<1, and a+b+c=1.

According to an embodiment, the overlithiated lithium transition metal oxide may include a compound represented by Formula 3:

$$Li[Li_aNi_bCo_cMn_dM_f]O_{2-x}F_x \qquad \text{Formula 3}$$

wherein in Formula 3, M is at least one metal selected from Ti, V, Al, Mg, Cr, Fe, Zr, rhenium (Re), boron (B), germanium (Ge), ruthenium (Ru), Sn, Nb, Mo, and platinum (Pt), and a+b+c+d+f=1; 0<a<1, 0<b<1, 0<c<1, 0<d<1, and 0≤f<1; and 0<x<0.1.

According to an embodiment, the overlithiated lithium transition metal oxide may include particles having an average particle diameter of about 10 nanometers (nm) to about 500 micrometers (μm).

According to an embodiment, the core may be formed of a secondary particle in which primary particles are agglomerated.

According to an embodiment, the polymer may include at least one selected from polypyrrole (PPy), polyaniline (PANI), polythiophene (PT), and poly(3,4-ethylenedioxythiophene) (PEDOT).

According to an embodiment, the polymer may include polypyrrole (PPy).

According to an embodiment, an amount of the polymer may be greater than about 1 weight percent (wt %) and equal to or less than about 10 wt %, based on a total weight of the positive active material.

According to an embodiment, the coating layer may cover an entire surface of the core.

According to an embodiment, the coating layer is adhered to a portion of the surface of the core and may be simultaneously disposed between the plurality of cores.

According to an embodiment, a thickness of the coating layer may be in a range of about 5 nm to about 100 nm.

According to an aspect of another exemplary embodiment, a positive electrode includes the cathode active material.

According to an aspect of another embodiment, a lithium battery includes the positive electrode.

According to an aspect of another embodiment, a method of manufacturing a positive active material includes: preparing a mixture which includes an overlithiated lithium transition metal oxide and a polymer having an oxidation potential of about 4.4 volts to about 4.7 volts versus lithium metal; and heat treating on the mixture to manufacture the positive active material.

According to an embodiment, the heat treatment may be performed at room temperature in vacuum.

BRIEF DESCRIPTION OF THE DRAWINGS

These and/or other aspects will become apparent and more readily appreciated from the following description of the exemplary embodiments, taken in conjunction with the accompanying drawings in which:

FIGS. 2 and 3 are graphs of current (microamperes, μA) versus voltage (volts versus Li) illustrating experimental results of linear sweep voltammetry of polypyrrole used in the coating of an overlithiated layered oxide (OLO) active material in Example 1, wherein FIG. 2 illustrates the results obtained by changing a voltage from about 2.5 V to about 4.2 V, and FIG. 3 illustrates the results obtained by changing a voltage from about 2.5 V to about 4.5 V;

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Layered" as would be understood by an artisan in the solid state sciences and as is used herein means that the atomic structure of the material is comprised of layers, e.g., a layer consisting of lithium and a layer comprising metal-centered oxygen octahedra, wherein the layer comprising the metal-centered oxygen octahedra may further comprise an additional element such as lithium.

"Overlithiated" as would be understood by an artisan in the solid state sciences and as is used herein means that the compound comprises Li on a transition metal crystallographic site, e.g., by substitution of the transition metal by Li.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium.

The "lanthanide elements" means the chemical elements with atomic numbers 57 to 71.

A C rate means a current which will discharge a battery in one hour, e.g., a C rate for a battery having a discharge capacity of 1.6 ampere-hours would be 1.6 amperes.

Hereinafter, the present disclosure will be described in more detail.

To address the demand for higher-capacity batteries, composite oxides having various structures have been proposed. For example, composite oxides of the formula $Li_2MO_3$—$LiM'O_2$, wherein M and M' are transition metals, and having a layered structure are disclosed. Since the layered composite oxide is able to intercalate/deintercalate a large amount of lithium (Li) ions in comparison to other positive active materials, the layered composite oxide can provide improved capacity. However, when a large amount of lithium is extracted from an oxide of the formula $Li_2MO_3$ as a charge and discharge cycle proceeds, structural changes occur in the lithium-rich composite oxide and its capacity can be significantly decreased. Thus, it is difficult to directly apply the lithium-rich composite oxide to commercial batteries.

Disclosed is a positive active material comprising a core including an overlithiated lithium transition metal oxide; and a coating layer which is disposed on at least a portion of a surface of the core, the coating layer comprising a polymer having an oxidation potential of about 4.4 volts (V) to about 4.7 V versus lithium (Li) metal.

According to an embodiment, the overlithiated lithium transition metal oxide may be represented by the following Formula 1.

$$xLi_2MO_3\text{-}(1-x)LiM'O_2 \quad \text{Formula 1}$$

In Formula 1, M has an average oxidation number of +4 and is at least one element selected from Period 2 to Period 5 of the Periodic Table of the Elements, M' has an average oxidation number of +3 and is at least one element selected from Period 2 to Period 5 elements, and $0<x<1$.

In an embodiment, M is at least one element selected from Periods 2 to 5 of the Periodic Table of the Elements. In an embodiment, M is at least one selected from manganese, titanium, zirconium, tin, and aluminum. In yet another embodiment, M comprises at least one selected from nickel (Ni), cobalt (Co), manganese (Mn). In yet another embodiment M is nickel, cobalt, or manganese. An embodiment in which M is manganese is specifically mentioned.

In an embodiment, M' is at least one element selected from Periods 2 to 5 of the Periodic Table of the Elements. In an embodiment, M is at least one selected from nickel, cobalt, iron, aluminum, magnesium, zinc, copper, chromium, vanadium, and niobium. In yet another embodiment, M' comprises at least one selected from nickel (Ni), cobalt (Co), manganese (Mn). In yet another embodiment M comprises nickel, cobalt, and manganese. An embodiment in which M is nickel, cobalt, and manganese is specifically mentioned.

The overlithiated lithium transition metal oxide may be a composite having a layered structure or may be in the form of a solid solution. In an embodiment, the overlithiated lithium transition metal oxide may be in the form of a mixture.

The overlithiated lithium transition metal oxide has a structure in which a $LiM'O_2$ phase and a $Li_2MnO_3$ phase are mixed. Herein, similar to a structure of $LiM'O_2$, $Li_2MnO_3$ basically has a structure in which a transition metal layer and a Li ion layer are alternatingly stacked, wherein about ⅓ of Mn ions belonging to the transition metal layer are substituted with Li ions. Thus, and while not wanting to be bound by theory, the $Li_2MnO_3$—$LiM'O_2$-based positive active material may provide improved capacity due to the Li ions that are additionally substituted in the transition metal layer.

In Formula 1, M, for example, may be at least one metal of Mn, titanium (Ti), zirconium (Zr), tin (Sn), and molybdenum (Mo), and M', for example, may be at least one metal of Ni, Co, Mn, iron (Fe), aluminum (Al), magnesium (Mg), zinc (Zn), copper (Cu), chromium (Cr), vanadium (V), and niobium (Nb).

According to an embodiment, the overlithiated lithium transition metal oxide may include a compound represented by Formula 2.

$$xLi_2MnO_3\text{-}(1-x)LiNi_aCo_bMn_cO_2 \quad \text{Formula 2}$$

In Formula 2, $0<x<1$, $0<a<1$, $0<b<1$, $0<c<1$, and $a+b+c=1$.

According to an embodiment, the overlithiated lithium transition metal oxide may further comprise, e.g., be doped with, fluorine.

For example, the overlithiated lithium transition metal oxide may be collectively represented by the following Formula 3 without phase distinction.

$$Li[Li_aNi_bCo_cMn_dM_f]O_{2-x}F_x \quad \text{Formula 3}$$

In Formula 3, M is at least one metal selected from Ti, V, Al, Mg, Cr, Fe, Zr, rhenium (Re), boron (B), germanium (Ge), ruthenium (Ru), Sn, Nb, and Mo, and $a+b+c+d+f=1$; $0<a<1$, $0<b<1$, $0<c<1$, $0<d<1$, and $0\leq f<1$; and $0<x<0.1$.

According to an embodiment, in Formula 3, M may be at least one metal selected from Ti, V, Al, Mg, Cr, Fe, and Zr.

According to an embodiment, in Formula 3, $0.1<a<0.25$, $0.1<b<0.4$, $0<c<0.2$, and $f=0$, and d may satisfy $0.8<(2a+b)/d<1.2$. In the foregoing range, an overlithiated lithium transition metal oxide providing improved capacity as well as improved lifetime characteristics may be provided.

The overlithiated lithium transition metal oxide may comprise particles having an average particle diameter of about 10 nanometers (nm) to about 500 micrometers (μm), about 20 nm to about 100 μm, or about 40 nm to about 10 μm. For example, the average particle diameter of the overlithiated lithium transition metal oxide may be in a range of about 10 nm to about 100 μm, or about 10 nm to about 50 μm. A lithium battery having improve physical properties may be provided within the above average particle diameter range. Furthermore, the overlithiated lithium transition metal oxide, for example, may be in the form of nanoparticles having an average particle diameter of about 500 nm or less, about 200 nm or less, about 100 nm or less, about 50 nm or less, or about 20 nm or less. Since the nanoparticle form may improve the mixture density of a positive electrode plate, it is advantageous for providing high-rate discharge characteristics. Also, since a specific surface area is decreased to reduce reactivity with an electrolyte, cycle characteristics may be improved.

The lithium transition metal oxide may comprise primary particles, or the lithium transition metal oxide may comprise secondary particles which comprise agglomerated or combined primary particles either alone or in combination with another active material.

The core may be a one-body particle consisting of only of the primary particle of the overlithiated lithium transition metal oxide, or may be a secondary particle formed by the agglomeration of primary particles of the overlithiated lithium transition metal oxide.

The average particle diameter "D50" is a particle diameter corresponding to 50% from the smallest particle when a total number of particles is set as 100% in a distribution curve in which particles are accumulated in the order of particle diameter from the smallest particle to the largest particle. D50 may be measured by a method well known to those skilled in the art, and, for example, may be measured with a particle size analyzer or may also be measured using a transmission electron microscope (TEM) or scanning electron microscope (SEM) image. As an example of another method, when the number of particles for each size range is counted by performing data analysis after measuring particle sizes with a measurement device using dynamic light scattering, an average particle diameter may be easily obtained by calculation therefrom.

The overlithiated lithium transition metal oxide has a theoretical capacity of about 360 milliampere hours per gram (mAh/g), which is greater than a capacity of a commercial active material which is about 275 mAh/g. The overlithiated lithium transition metal oxide also has an actual reversible capacity of about 250 mAh/g or more. Thus, improved capacity characteristics may be provided in comparison to a commercial positive active material, e.g., a positive active material having a capacity of about 150 to 170 mAh/g.

A coating layer, which includes a polymer having an oxidation potential of about 4.4 V to about 4.7 V versus Li metal, is disposed, e.g., formed, on at least a portion of the surface of the core. The polymer can sustain a high voltage without oxidation and may improve lifetime characteristics at a high voltage when coated on the surface of the overlithiated lithium transition metal oxide. When the voltage is greater than about 4.7 V, the electrolyte may decompose, and thus, it is appropriate for the polymer to have oxidation characteristics in a voltage range of about 4.4 V to about 4.7 V.

Due to the characteristics of the overlithiated lithium transition metal oxide, the $LiMO_2$ phase participates in charge and discharge at a low voltage, e.g., a voltage of less than about 4.4 V, and the $Li_2MnO_3$ phase participates in charge and discharge at a high voltage, e.g., a voltage of equal to or greater than about 4.4 V, in which, since all of the Mn in $Li_2MnO_3$ are in an oxidation state of +4 during high-voltage charging, Mn may no longer be oxidized as Li deintercalation proceeds and electrons are removed from the 2p orbital of oxygen ions in the crystal. Accordingly, and while not wanting to be bound by theory, it is understood that the crystal structure of the $Li_2MnO_3$ becomes unstable and cracks occurs in the surface thereof while unstable oxygen ions in the lattice are removed from the lattice in the form of oxygen ($O_2$) gas as the charge and discharge cycle proceeds. As a result, lifetime degradation may occur.

However, and while not wanting to be bound by theory, it is understood that when the overlithiated lithium transition metal oxide is coated with a polymer capable of donating electrons at a high voltage, the generation of unstable, oxidized oxygen on the surface thereof during high voltage operation may be suppressed and the generation of $O_2$ gas may be suppressed. As a result, the structure of the overlithiated lithium transition metal oxide may become stable, and thus, the lifetime characteristics may be improved.

The polymer has an oxidation potential of about 4.4 V to about 4.7 V versus Li metal, wherein since the polymer has oxidation characteristics in a voltage range in which the $Li_2MnO_3$ phase is activated, i.e., a voltage range of about 4.4 V to about 4.7 V, the polymer may compensate a shortage of electrons in a surface portion of the overlithiated lithium transition metal oxide.

Examples of the polymer may be polypyrrole (PPy), polyaniline (PANI), polythiophene (PT), and poly(3,4-ethylenedioxythiophene) (PEDOT). However, the polymer is not limited thereto, and any suitable polymer may be used without limitation as long as it has an oxidation potential of about 4.4 V to about 4.7 V versus Li metal. The polymer may be used alone or in combination of two or more thereof. According to an embodiment, the polymer may include polypyrrole.

According to an embodiment, the coating layer may be uniformly and continuously coated on the surface of the core. According to another embodiment, the coating layer may be formed in a state of being adhered to a portion of the surface of the core. According to another embodiment, the coating layer, in a state of being adhered to a portion of the surface of the core, may be randomly dispersed while being simultaneously disposed between a plurality of cores.

An amount of the polymer may be greater than about 0 weight percent (wt %) and equal to or less than about 10 wt %, based on a total weight of the positive active material. For example, the amount of the polymer may be in a range of about 0.01 wt % to about 10 wt %, about 0.1 wt % to about 10 wt %, about 1 wt % to about 7 wt %, or about 3 wt % to about 5 wt % based on the total weight of the positive active material. Within the above range, the polymer may compensate the shortage of electrons in the surface portion of the overlithiated lithium transition metal oxide during high voltage operation.

A thickness of the coating layer is not particularly limited, and, for example, may be in a range of about 5 nm to about 100 nm, about 10 nm to about 90 nm, about 15 nm to about 80 nm, or about 20 nm to about 70 nm.

Thus, the lifetime characteristics of the positive active material including the overlithiated lithium transition metal oxide at a high voltage may be improved due to the coating layer which includes a polymer having an oxidation potential of about 4.4 V to about 4.7 V versus Li metal.

A method of manufacturing a positive active material according to another embodiment comprises preparing a mixture which includes an overlithiated lithium transition metal oxide and a polymer having an oxidation potential of about 4.4 V to about 4.7 V versus Li metal; and heat treating the mixture to manufacture the positive active material.

The overlithiated lithium transition metal oxide and the polymer having an oxidation potential of about 4.4 V to about 4.7 V versus Li metal are the same as described above.

A solvent usable in the mixture may include water and ethanol. Any suitable solvent may be used. Representative classes of solvents include hydrocarbons, ethers, esters, sulfur-based solvents, chlorinated hydrocarbons, aromatic hydrocarbons nitrated hydrocarbons, amides, and ketones.

According to an embodiment, the method may further include adding an oxidant to the mixture comprising the overlithiated lithium transition metal oxide and the polymer and mixing. The oxidant is not particularly limited, and any suitable oxidant may be used. Representative oxidants include, for example, peroxides, such as hydrogen peroxide ($H_2O_2$) and ammonium peroxide disulfide, and derivatives thereof; oxyacids and salts thereof such as nitric acid ($HNO_3$) and a salt thereof, perchloric acid ($HClO_4$) and a salt thereof, hot concentrated sulfuric acid ($H_2SO_4$), hypochlorite (HClO) or a salt thereof, permanganate ($HMnO_4$) or a salt thereof, and chromic acid ($H_2CrO_4$) or a salt thereof; high oxidation state metal compounds such as lead dioxide ($PbO_2$), manganese dioxide ($MnO_2$), copper oxide (CuO), and ferric chloride ($FeCl_3$); or halogens such as fluorine ($F_2$), chlorine ($Cl_2$), bromine ($Br_2$), and iodine ($I_2$) may be used.

According to an embodiment, the heat treatment may be performed in a temperature range of about 0° C. to a temperature which is less than a thermal decomposition temperature of the polymer in vacuum. For example, the heat treatment may be performed in a temperature range of about 0° C. to about 100° C., about 5° C. to about 80° C., or about 10° C. to about 60° C. For example, the heat treatment may be performed at room temperature. The heat treatment may be performed for about 5 hours to about 20 hours.

An overlithiated lithium transition metal oxide coated with the polymer may be obtained through the heat treatment.

A positive electrode according to another embodiment of the present disclosure includes the positive active material.

For example, a positive electrode slurry composition can be prepared by mixing the positive active material, a conductive agent, a binder, and a solvent. A positive electrode plate with a positive active layer formed thereon may be prepared by directly coating and drying the positive electrode slurry composition on a positive electrode collector. Alternatively, the positive electrode slurry composition can be cast on a separate support and a positive electrode plate with a positive active layer formed thereon may then be prepared by laminating a film detached from the support on the positive electrode collector.

Examples of the conductive agent may be carbon black, graphite fine particles, natural graphite, artificial graphite, acetylene black, Ketjen black, carbon fibers; carbon nanotubes; metals such as copper, nickel, aluminium, or silver, and conductive polymers such as a polyphenylene derivative. The conductive agent may be in the form of a powder, fiber, or tube. However, the conductive agent is not limited thereto and any suitable conductive agent may be used.

Examples of the binder may be vinylidene fluoride/hexafluoropropylene copolymer, polyvinylidene fluoride, polyacrylonitrile, poly(methyl methacrylate), polytetrafluoroethylene (PTFE), styrene butadiene rubber-based polymer, and mixtures thereof. Examples of the solvent may be N-methylpyrrolidone (NMP), acetone, and water. However, the solvent is not necessarily limited thereto and any suitable solvent may be used.

In some cases, pores in the electrode plate may be formed by further adding a plasticizer to the positive electrode slurry composition.

Contents of the positive active material, conductive agent, binder, and solvent are amounts typically used in a lithium battery and can be determined by one of skill in the art without undue experimentation. One or more of the conductive agent, binder, and solvent may be omitted according to applications and configurations of lithium batteries.

Also, the positive electrode may include the positive active material alone, or in addition to the above-described positive active material the positive electrode may further include a second positive active material including at least one different technical feature such as having a different composition or particle diameter.

The second positive active material may be a lithium-containing metal oxide, and any suitable positive active material used in the art may be used without limitation. For example, one or more composite oxides of metals selected from cobalt, manganese, nickel, and combinations thereof and lithium may be used, and as particular examples thereof, a compound expressed as one of the following chemical formulas may be used: $Li_aA_{1-b}B'_bD'_2$ (where $0.90 \leq a \leq 1$, $0 \leq b \leq 0.5$); $Li_aE_{1-b}B'_bO_{2-c}D'_c$ (where $0.90 \leq a \leq 1$, $0 \leq b \leq 0.5$, $0 \leq c \leq 0.05$); $LiE_{2-b}B'_bO_{4-c}D'_c$ (where $0 \leq b \leq 0.5$, $0 \leq c \leq 0.05$); $Li_aNi_{1-b-c}Co_bB'_cD'_\alpha$ (where $0.90 \leq a \leq 1$, $0 \leq b \leq 0.5$, $0 \leq c \leq 0.05$, $0 < \alpha \leq 2$); $Li_aNi_{1-b-c}Co_bB'_cO_{2-\alpha}F'_\alpha$ (where $0.90 \leq a \leq 1$, $0 \leq b \leq 0.5$, $0 \leq c \leq 0.05$, $0 < \alpha < 2$); $Li_aNi_{1-b-c}Co_bB'_cO_{2-\alpha}F'_2$ (where $0.90 \leq a \leq 1$, $0 \leq b \leq 0.5$, $0 \leq c \leq 0.05$, $0 < \alpha < 2$); $Li_aNi_{1-b-c}Mn_bB'_cD'_\alpha$ (where $0.90 \leq a \leq 1$, $0 \leq b \leq 0.5$, $0 \leq c \leq 0.05$, $0 < \alpha \leq 2$); $Li_aNi_{1-b-c}Mn_bB'_cO_{2-\alpha}F'_\alpha$ (where $0.90 \leq a \leq 1$, $0 \leq b \leq 0.5$, $0 \leq c \leq 0.05$, $0 < \alpha < 2$); $Li_aNi_{1-b-c}Mn_bB'_cO_{2-\alpha}F'_2$ (where $0.90 \leq a \leq 1$, $0 \leq b \leq 0.5$, $0 \leq c \leq 0.05$, $0 < \alpha < 2$); $Li_aNi_bE_cG_dO_2$ (where $0.90 \leq a \leq 1$, $0 \leq b \leq 0.9$, $0 \leq c \leq 0.5$, $0.001 \leq d \leq 0.1$); $Li_aNi_bCo_cMn_dGeO_2$ (where $0.90 \leq a \leq 1$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1$, $0.001 \leq b \leq 0.1$); $Li_aCoG_bO_2$ (where $0.90 \leq a \leq 1$, $0.001 \leq b \leq 0.1$); $Li_aMnG_bO_2$ (where $0.90 \leq a \leq 1$, $0.001 \leq b \leq 0.1$); $Li_aMnG_bO_4$ (where $0.90 \leq a \leq 1$, $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulas, A is Ni, Co, Mn, or a combination thereof; B' is Al, Ni, Co, Mn, Cr, Fe, Mg, strontium (Sr), V, a rare earth element, or a combination thereof; D' is oxygen (O), fluorine (F), sulfur (S), phosphorus (P), or a combination thereof; E is Co, Mn, or a combination thereof; F' is F, S, P, or a combination thereof; G is Al, Cr, Mn, Fe, Mg, lanthanum (La), cerium (Ce), Sr, V, or a combination thereof; Q is Ti, Mo, Mn, or a combination thereof; I' is Cr, V, Fe, scandium (Sc), yttrium (Y), or a combination thereof; and J is V, Cr, Mn, Co, Ni, Cu, or a combination thereof.

Examples of the second positive active material may be $LiCoO_2$, $LiMn_xO_{2x}$ (x=1, 2), $LiNi_{1-x}Mn_xO_2$ ($0<x<1$), $LiNi_{1-x-y}Co_xMn_yO_2$ ($0 \leq x \leq 0.5$, $0 \leq y \leq 0.5$), $FePO_4$, etc.

A positive active material having a second coating layer may be used, or the positive active material may be provided by mixing the positive active material and a compound having a second coating layer. The second coating layer may include a compound of a coating element such as an oxide, hydroxide, oxyhydroxide, oxycarbonate, or hydroxycarbonate of a coating element. The compound constituting the second coating layer may be amorphous or crystalline. Examples of the coating element included in the second coating layer may be Mg, Al, Co, potassium (K), sodium (Na), calcium (Ca), silicon (Si), Ti, V, Sn, Ge, gallium (Ga), B, arsenic (As), Zr, and mixtures thereof. Any suitable coating method may be used for a process of forming a second coating layer as long as suitable coating may be provided by the method (e.g., spray coating, or dipping) that does not adversely affect the physical properties of the positive active material due to using such coating elements on the positive active material. Further detailed description related to the coating method is not provided for clarity.

The positive electrode collector may have a thickness range of about 3 μm to about 500 μm. The positive electrode collector is not particularly limited and any suitable positive electrode collector may be used as long as it does not generate an undesirable chemical change in the battery and has suitable conductivity. Examples of the positive electrode collector may be copper, stainless steel, aluminum, nickel, titanium, sintered carbon, copper or stainless steel surface treated with carbon, nickel, titanium, or silver, and an aluminum-cadmium alloy. Also, adhesion of the positive active material may also be increased by forming fine irregularities on a surface of the positive electrode collector, and the positive electrode collector may be used in various forms such as a film, sheet, foil, net, porous body, foam, or nonwoven fabric.

A mixture density of the positive electrode may be at least about 2.0 g/cc.

A lithium battery according to another embodiment may include the positive electrode including the positive active material. The lithium battery, for example, includes a positive electrode including the positive active material; a negative electrode disposed to face the positive electrode; and an electrolyte disposed between the positive electrode and the negative electrode.

In the lithium battery, the positive electrode is prepared according to the above-described method of preparing a positive electrode.

A negative electrode may be prepared as follows: The negative electrode may be prepared in the same manner as the positive electrode except that a negative active material is used instead of the positive active material. Also, a conductive agent, a binder, and a solvent that are used in a negative electrode slurry composition may be the same as those described in the case of the positive electrode.

For example, the negative electrode slurry composition is prepared by mixing a negative active material, a binder, a solvent, and, selectively, a conductive agent, and the negative active material composition is directly coated on a negative electrode collector to prepare a negative electrode plate. Alternatively, the negative electrode slurry composition is cast on a separate support and a negative electrode plate may then be prepared by laminating negative active material films detached from the support on a negative electrode collector.

Also, with respect to the negative active material, any suitable negative active material used in a lithium battery in the art may be used. For example, the negative active material may include at least one selected from lithium metal, a metal alloyable with lithium, transition metal oxide, non-transition metal oxide, and a carbon-based material.

Examples of the metal alloyable with lithium may be Si, Sn, Al, Ge, lead (Pb), bismuth (Bi), antimony (Sb), an Si—Y' alloy (wherein Y' is an alkali metal, an alkaline earth metal, a Group 13 to Group 16 element, a transition metal, a rare earth element, or a combination element thereof, and is not Si), an Sn—Y" alloy (wherein Y" is alkali metal, an alkaline earth metal, a Group 13 to Group 16 element, a transition metal, a rare earth element, or a combination thereof, and is not Sn). Examples of the element Y' and Y" may independently be Mg, Ca, Sr, barium (Ba), radium (Ra), Sc, Y, Ti, Zr, hafnium (Hf), rutherfordium (Rf), V, Nb, tantalum (Ta), dubnium (Db), Cr, Mo, tungsten (W), seaborgium (Sg), technetium (Tc), Re, bohrium (Bh), Fe, Pb, Ru, osmium (Os), hassium (Hs), rhodium (Rh), iridium (Ir), palladium (Pd), platinum (Pt), Cu, silver (Ag), gold (Au), Zn, cadmium (Cd), B, Al, Ga, Sn, indium (In), Ge, P, As, Sb, Bi, S, selenium (Se), tellurium (Te), polonium (Po), and combinations thereof.

For example, the lithium transition metal alloy negative active material may comprise lithium titanate, vanadium oxide, and lithium vanadium oxide.

For example, the non-transition metal negative active material may comprise $SnO_2$, or $SiO_x$ ($0<x<2$).

The carbon-based material may be crystalline carbon, amorphous carbon, or a mixture thereof. The crystalline carbon may be graphite such as shapeless, plate, flake, spherical, or fibrous natural graphite or artificial graphite, and the amorphous carbon may be soft carbon (low-temperature fired carbon) or hard carbon, mesophase pitch carbide, fired coke.

The contents of the negative active material, conductive agent, binder, and solvent are amounts typically used in a lithium battery and can be determined by one of skill in the art without undue experimentation.

The negative electrode collector generally has a thickness range of about 3 μm to about 500 μm. The negative electrode collector is not limited as long as it does not generate an undesirable chemical change in the battery and has suitable conductivity. Examples of the negative electrode collector may be copper, stainless steel, aluminum, nickel, titanium, sintered carbon, copper or stainless steel surface treated with carbon, nickel, titanium, or silver, or an aluminum-cadmium alloy. Also, adhesion of the negative active material may also be increased by forming fine irregularities on a surface of the negative electrode collector, and the negative electrode collector may be used in various forms such as a film, sheet, foil, net, porous body, foam, or nonwoven fabric.

The positive electrode and the negative electrode may be separated by a separator, and any suitable separator may be used. In particular, a separator having high moisture-retention ability for an electrolyte as well as low resistance to the transfer of electrolyte ions is suitable. Examples of the separator may be a material selected from glass fibers, polyester, Teflon, polyethylene, polypropylene, polytetrafluoroethylene (PTFE), and combinations thereof. The separator may be a nonwoven or woven fabric type. The separator having a pore diameter of about 0.01 μm to about 10 μm and a thickness of about 5 μm to about 300 μm is generally used.

A lithium salt-containing a non-aqueous electrolyte comprises a non-aqueous electrolyte and lithium. A non-aqueous electrolyte solution, an organic solid electrolyte, and an inorganic solid electrolyte are used as the non-aqueous electrolyte.

Examples of the solvent for the non-aqueous electrolyte solution may be aprotic organic solvents such as N-methyl-2-pyrrolidinone, propylene carbonate, ethylene carbonate, butylene carbonate, dimethyl carbonate, diethyl carbonate, γ-butyrolactone, 1,2-dimethoxy ethane, tetrahydrofuran, 2-methyltetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, a dioxolane derivative, sulfolane, methylsulfolane, 1,3-dimethyl-2-imidazolidinone, a propylene carbonate derivative, a tetrahydrofuran derivative, ether, methyl propionate, and ethyl propionate.

Examples of the organic solid electrolyte may be a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer including an ionic dissociation group.

Examples of the inorganic solid electrolyte may be nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Any suitable lithium salt may be used. For example, as a material suitable for being dissolved in the non-aqueous electrolyte, at least one material, such as LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic carboxylic acid lithium, lithium tetraphenyl borate, and imide, may be used as the lithium salt.

The lithium battery may be classified as a lithium-ion battery, a lithium-ion polymer battery, or a lithium polymer battery according to type of separator and electrolyte used, may be classified as a cylindrical, prismatic, coin, or pouch type according to its shape, and may be classified as a bulk type or a thin film type according to its size. Also, both lithium primary and secondary batteries may be included.

Since manufacturing methods of batteries of the foregoing types are widely known in the art, further detailed descriptions thereof will not be provided.

Figure 1:
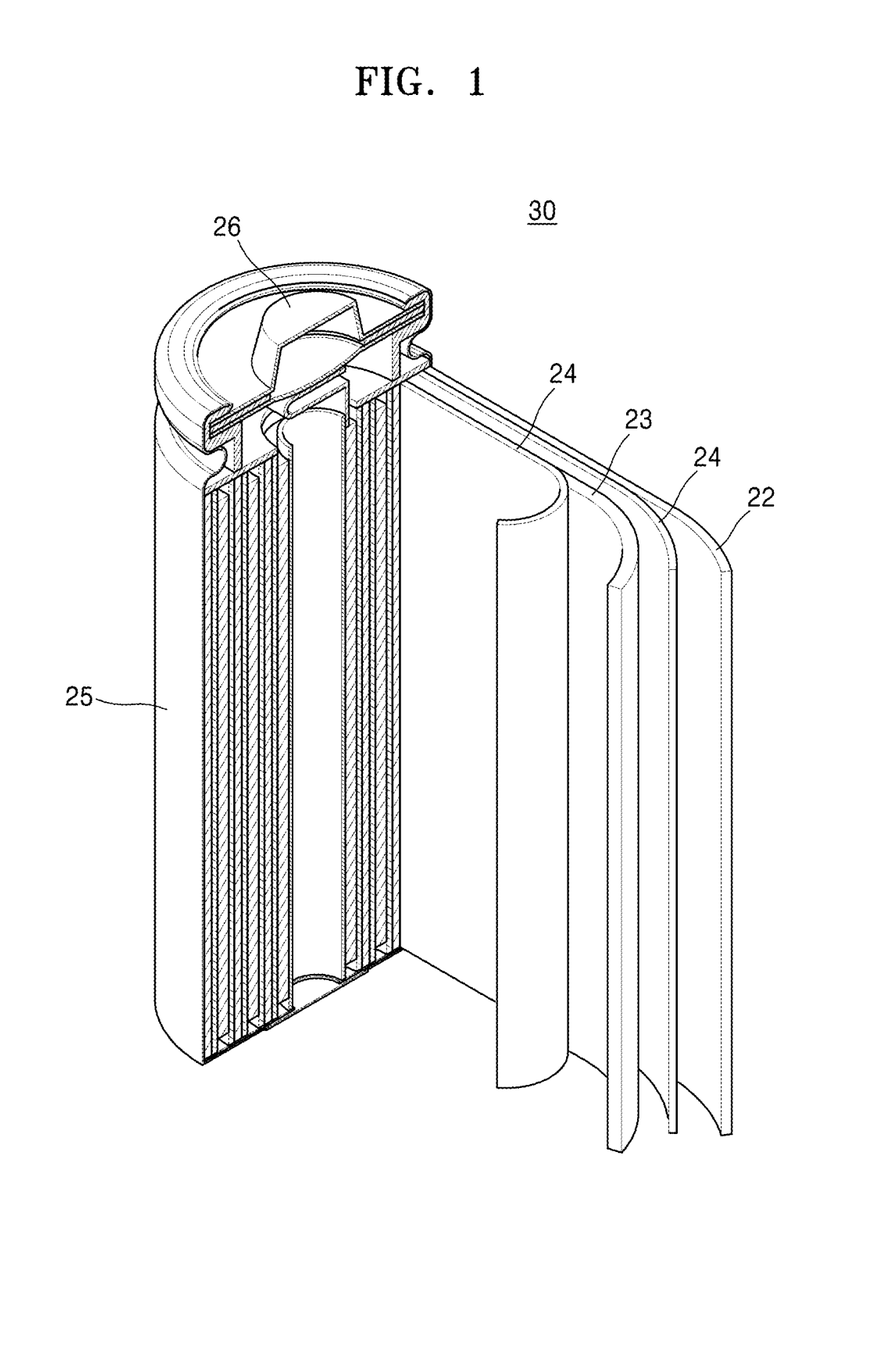
FIG. 1 is a schematic diagram illustrating a schematic structure of an embodiment of a lithium battery.

FIG. 1 schematically illustrates a structure of an embodiment of a lithium battery.

Referring to FIG. 1, the lithium battery 30 includes a positive electrode 23, a negative electrode 22, and a separator 24 disposed between the positive electrode 23 and the negative electrode 22. The positive electrode 23, the negative electrode 22, and the separator 24 are wound and folded to be contained in a battery case 25. Subsequently, an electrolyte is injected into the battery case 25 and the lithium battery 30 may be completed by being sealed with a sealing member 26. The battery case 25 may be a cylindrical, rectangular, or thin-film type. The lithium battery may be a lithium-ion battery.

The lithium battery is also suitable for applications requiring high capacity, high power, and high-temperature operation, such as electric vehicles, in addition to applications such as typical mobile phones and portable computers, and may also be used in hybrid vehicles by combining with a typical internal combustion engine, fuel cell, or super capacitor. Furthermore, the lithium battery may be used in electric bikes, power tools, and all other applications which require high power, high voltage, and high-temperature operation.

The present disclosure is described in more detail according to the following examples and comparative examples. However, the examples only exemplify the technical idea of the present disclosure, and the scope of the present disclosure is not limited thereto.

EXAMPLES

Example 1

(1) Manufacture of Positive Active Material

A material having a composition of $0.40Li_2MnO_3$-$0.60LiNi_{1/3}CO_{1/3}Mn_{1/3}O_2$ was used as an overlithiated layered oxide (OLO) active material. About 10 grams (g) of the OLO active material was put in about 100 mL of water and ultrasonically dispersed for about 10 minutes to prepare an OLO dispersion solution. About 0.5 g of $(NH_4)_2S_2O_8$ and about 2 g of pyrrole $(C_4H_5N)$ were added to the solution and stirred for about 6 hours. Pyrrole may be oxidized by $(NH_4)_2S_2O_8$ to form a polypyrrole polymer. A polypyrrole-coated OLO active material was obtained by annealing the solution at room temperature for about 12 hours in vacuum.

(2) Coin Half-Cell Preparation

The polypyrrole-coated OLO active material and a carbon conductive agent (Super-P, Timcal Ltd.) were uniformly mixed at a weight ratio of about 92:4, and a slurry was then prepared by adding 100 g of a polyvinylidene fluoride (PVDF) 2 wt % binder solution to 42 g of the mixture of the polypyrrole-coated OLO active material and the carbon conductive agent to obtain a weight ratio of active material: carbon conductive agent:binder of about 92:4:4. The polyvinylidene fluoride (PVDF) binder solution was prepared by combining polyvinylidene fluoride and NMP.

About 15 micrometers (μm) thick aluminium foil was coated with the active material slurry and then dried in a vacuum to prepare a positive electrode plate. A coin half-cell (CR2016 type) having a diameter of about 12 millimeters (mm) was then prepared using the positive electrode plate.

In the coin cell, metallic lithium was used as a counter electrode, a polypropylene separator (Celgard 3501) was used as a separator, and an electrolyte used was prepared by dissolving about 1.3 molar (M) $LiPF_6$ in a solvent mixture of ethylene carbonate (EC):diethyl carbonate (DEC) in a volume ratio of about 3:7.

Comparative Example 1

A coin half-cell was prepared in the same manner as in Example 1 except that an overlithiated lithium transition metal oxide active material, on which a polypyrrole coating layer was not formed, was used as a positive active material.

Evaluation Example 1

Oxidation Potential Evaluation

Figure 2:
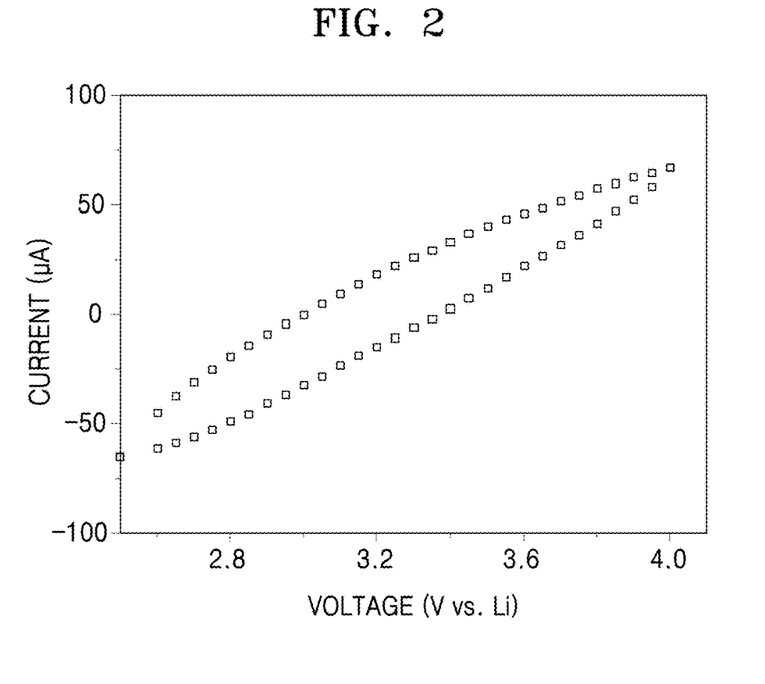
Figure 3:
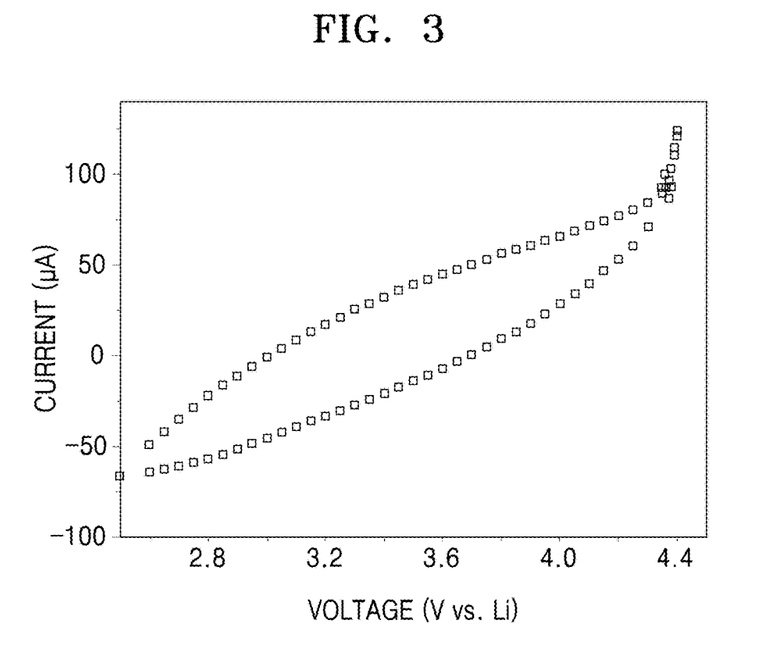

Changes in current due to an increase in voltage was measured for polypyrrole, which was used for the coating of the overlithiated lithium transition metal oxide active material in Example 1, by linear sweep voltammetry, and the results thereof are presented in FIGS. 2 and 3. FIG. 2 illustrates the results obtained by changing a voltage from about 2.5 V to about 4.2 V, and FIG. 3 illustrates the results obtained by changing a voltage from about 2.5 V to about 4.5 V.

In the measurement, platinum electrodes were respectively used as a working electrode and a counter electrode, and Li metal was used as a reference electrode.

As illustrated in FIGS. 2 and 3, it may be understood that oxidation did not occur in polypyrrole even if the voltage was increased to about 4.2 V (vs. Li), but oxidation occurred at a voltage near 4.5 V when the voltage was increased to a high value of about 4.5 V (vs. Li). Since $Li_2MnO_3$ may be activated at the voltage near 4.5 V, it may be understood that the OLO active material used in Example 1 was suitable for the coating.

Evaluation Example 2

SEM Analysis

Figure 4:
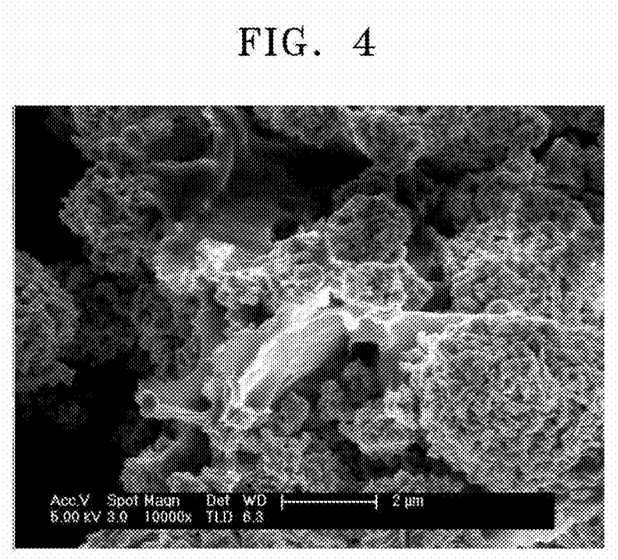
FIGS. 4 and 5 are images of a positive active material manufactured in Example 1 showing the results of scanning electron microscope (SEM) analysis.
Figure 5:
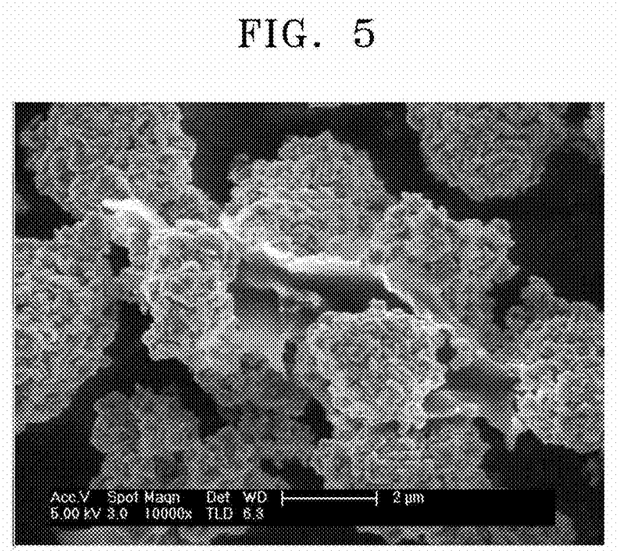

Images of the positive active material manufactured in Example 1, which is analyzed using a scanning electron microscope (SEM), are respectively presented in FIGS. 4 and 5.

As illustrated in FIGS. 4 and 5, it may be understood that a polypyrrole coating layer was present on the surface of the overlithiated lithium transition metal oxide active material and the coating layer was disposed between a plurality of OLO active material particles while the plurality of overlithiated lithium transition metal oxide active material particles were adhered to polypyrrole.

Evaluation Example 3

Battery Characteristic Evaluation

In order to identify a polymer coating effect of the overlithiated lithium transition metal oxide active material in Example 1, charge and discharge were performed as follows:

The coin half-cells of Example 1 and Comparative Example 1 were charged at a 0.1 C constant current rate to a voltage of about 4.7 V (vs. Li) at about 25° C. and discharged at a 0.1 C constant current rate until the voltage reached about 2.5 V (vs. Li) during discharge (formation operation).

The coin half-cells subjected to the above formation operation were charged at a 1.0 C constant current rate to a voltage of about 4.6 V (vs. Li) at about 25° C. and discharged at a 1.0 C constant current rate until the voltage reached about 2.5 V (vs. Li) during discharge. The above cycle was repeated 40 times.

Figure 6:
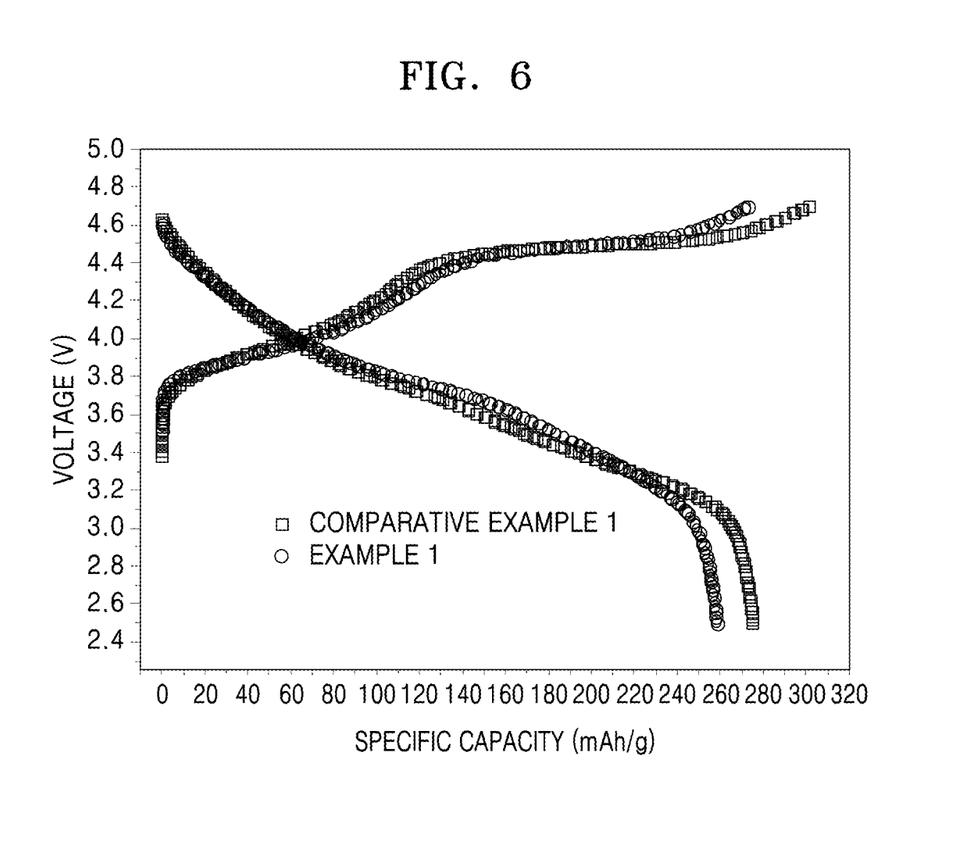
FIG. 6 is a graph of voltage (volts vs. Li) versus specific capacity (milliampere hours per gram, mAh/g) showing initial charge and discharge characteristics of coin half-cells of Example 1 and Comparative Example 1.
Figure 7:
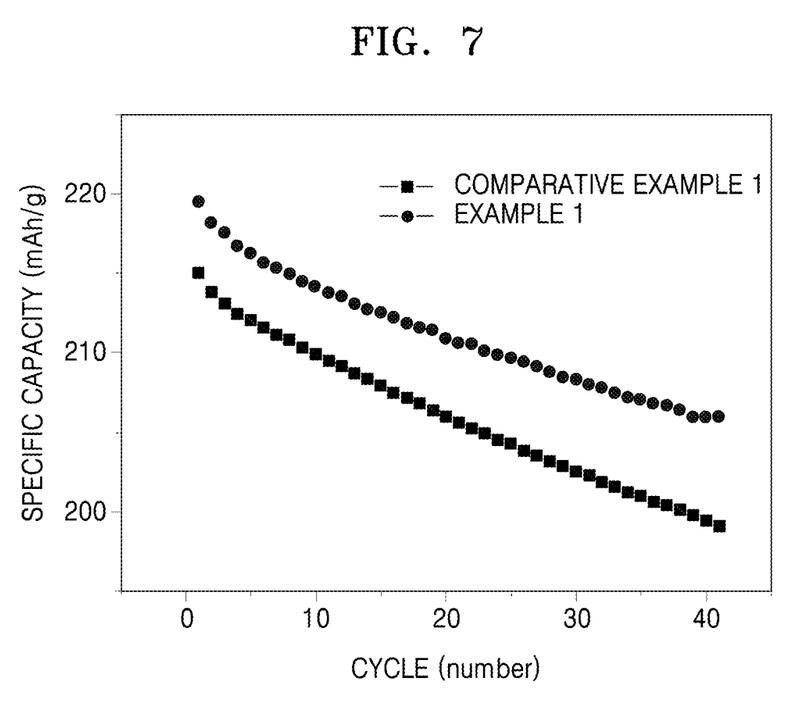
FIG. 7 is a graph of specific capacity (mAh/g) versus cycle number (number) showing lifetime characteristics of coin half-cells of Example 1 and Comparative Example 1.

Initial charge and discharge curves of Example 1 and Comparative Example 1 are illustrated in FIG. 6, and discharge capacities vs. cycle number are illustrated in FIG. 7.

As illustrated in FIG. 6, when comparing the charge curves of Example 1 and Comparative Example 1, it was observed that changes in the charge curve (at less than about 4.5 V) of an NCM phase was not significant when the overlithiated lithium transition metal oxide active material was coated with the polymer, but a 4.5 V plateau appeared during the activation of $Li_2MnO_3$ was decreased by the polymer coating.

However, as illustrated in FIG. 7, it may be understood that lifetime characteristics of the overlithiated lithium transition metal oxide active material, in which the polypyrrole coating layer was present, were improved in comparison to those of the uncoated overlithiated lithium transition metal oxide active material. This indicated that the overlithiated lithium transition metal oxide active material was structurally stabilized due to the coating of the polymer having high-voltage oxidation characteristics, and thus, the lifetime characteristics during high voltage operation were improved.

With respect to an overlithiated lithium transition metal oxide material, it is determined that the overlithiated lithium transition metal oxide material is composed of nanocomposites of $Li_2MnO_3$ and $LiM'O_2$, and a plateau appears when $Li_2MnO_3$ is charged. Since Mn in $Li_2MnO_3$ is in an oxidation state of +4, Mn may no longer provide charge compensation as Li deintercalation proceeds. Thus, it is understood that the stability of oxygen ions in the crystal lattice is low because electrons are removed from the 2p orbital of the oxygen ions. As illustrated in FIG. 2, polypyrrole generated electrons while being oxidized at about 4.4 V or more in which a plateau curve appeared during the charge of the overlithiated lithium transition metal oxide positive active material. This is considered due to the fact that the material coated on the surface of the overlithiated lithium transition metal oxide positive electrode may donate electrons at about 4.4 V or more to suppress the oxidation of oxygen ions due to the shortage of electrons of the overlithiated lithium transition metal oxide material during the charging process. With respect to the polypyrrole overlithiated lithium transition metal oxide positive electrode, the 0.1 C discharge capacity in the formation operation was lower than that of the Comparative Example. However, since localized structural collapse was suppressed while the structure was stabilized, rate characteristics were also improved. Thus, the polypyrrole overlithiated lithium transition metal oxide positive electrode provided greater discharge capacity during the measurement of lifetime characteristics at 1.0 C.

As described above, according to the one or more of the above exemplary embodiments, since the surface of an overlithiated lithium transition metal oxide is coated with a polymer having high-voltage oxidation characteristics, oxidation of the surface of the positive active material may be suppressed. Thus, the positive active material according to an aspect of the present disclosure may improve lifetime characteristics of a lithium battery during high voltage operation.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A positive active material comprising:
a core comprising an overlithiated lithium transition metal oxide; and
a coating layer which is disposed on at least a portion of a surface of the core, the coating layer comprising an organic polymer having an oxidation potential of about 4.4 volts to about 4.7 volts versus lithium metal.

2. The positive active material of claim 1, wherein the overlithiated lithium transition metal oxide is represented by Formula 1:

$$xLi_2MO_3\text{-}(1-x)LiM'O_2 \qquad \text{Formula 1}$$

wherein in Formula 1,
M has an average oxidation number of +4 and is at least one element selected from Period 2 to Period 5 of the Periodic Table of the Elements,
M' has an average oxidation number of +3 and is at least one element selected from Period 2 to Period 5 elements, and
$0<x<1$.

3. The positive active material of claim 2, wherein, in Formula 1, M is at least one metal selected from manganese, titanium, zirconium, tin, and molybdenum, and
M' is at least one metal selected from nickel, cobalt, Mn, iron, aluminum, magnesium, zinc, copper, chromium, vanadium, and niobium.

4. The positive active material of claim 1, wherein the overlithiated lithium transition metal oxide is a positive active material represented by Formula 2:

$$xLi_2MnO_3\text{-}(1-x)LiNi_aCo_bMn_cO_2 \qquad \text{Formula 2}$$

wherein in Formula 2, $0<x<1$, $0<a<1$, $0<b<1$, $0<c<1$, and $a+b+c=1$.

5. The positive active material of claim 1, wherein the overlithiated lithium transition metal oxide is a positive active material represented by Formula 3:

$$Li[Li_aNi_bCo_cMn_dM_f]O_{2-x}F_x \qquad \text{Formula 3}$$

wherein in Formula 3, M is at least one metal selected from Ti, V, Al, Mg, Cr, Fe, Zr, rhenium, boron, germanium, ruthenium, Sn, Nb, Mo, and platinum, and
$a+b+c+d+f=1$; $0<a<1$, $0<b<1$, $0<c<1$, $0<d<1$, and $0<f<1$; and $0<x<0.1$.

6. The positive active material of claim 5, wherein, in Formula 3, M is at least one metal selected from Ti, V, Al, Mg, Cr, Fe, and Zr.

7. The positive active material of claim 5, wherein, in Formula 3, $0.1<a<0.25$, $0.1<b<0.4$, $0<c<0.2$, and $f=0$, and d satisfies $0.8<(2a+b)/d<1.2$.

8. The positive active material of claim 1, wherein the overlithiated lithium transition metal oxide comprises particles having an average particle diameter of about 10 nanometers to about 500 micrometers.

9. The positive active material of claim 1, wherein the core is in the form of a secondary particle, the secondary particle comprising an agglomeration of primary particles.

10. The positive active material of claim 1, wherein the polymer comprises at least one selected from polypyrrole, polyaniline, polythiophene, and poly(3,4-ethylenedioxythiophene).

11. The positive active material of claim 10, wherein the polymer comprises polypyrrole.

12. The positive active material of claim 1, wherein an amount of the polymer is greater than about 0 weight percent and equal to or less than about 10 weight percent, based on a total weight of the positive active material.

13. The positive active material of claim 1, wherein the coating layer is on an entire surface of the core.

14. The positive active material of claim 1, wherein the coating layer is adhered to at least a portion of the surface of the core, and is simultaneously disposed between the plurality of cores.

15. A lithium battery comprising the positive active material of claim 1.

16. A method of manufacturing a positive active material of claim 1, the method comprising:

preparing a mixture which includes an overlithiated lithium transition metal oxide and an organic polymer having an oxidation potential of about 4.4 volts to about 4.7 volts versus lithium metal; and heat treating the mixture to manufacture the positive active material.

17. The method of claim 16, wherein the heat treatment is performed at room temperature and in vacuum.

18. The method of claim 16, wherein the polymer is polypyrrole.

19. The method of claim 18, wherein the polymer is provided by contacting pyrrole with an oxidant.

* * * * *